Aug. 19, 1924.

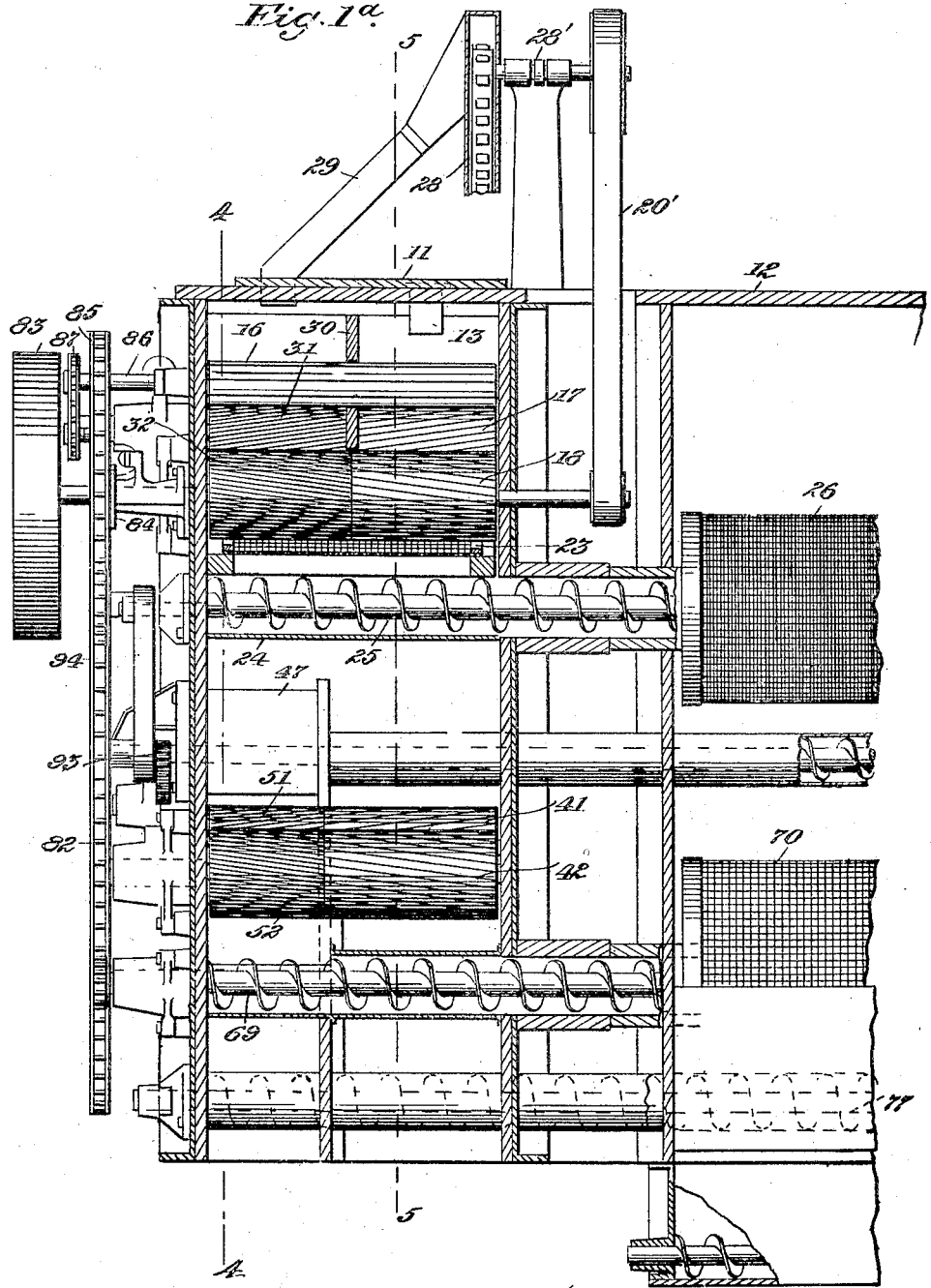

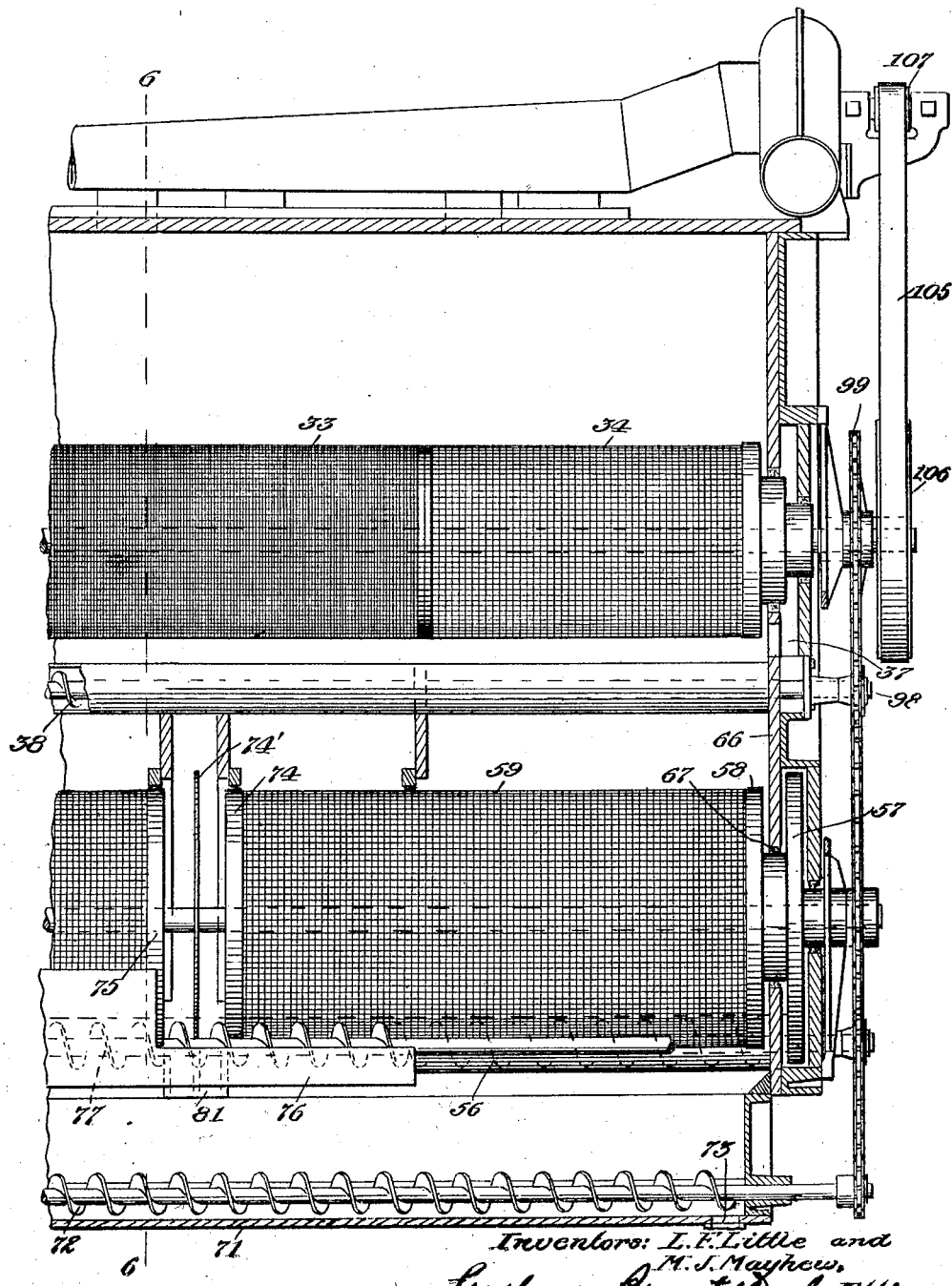

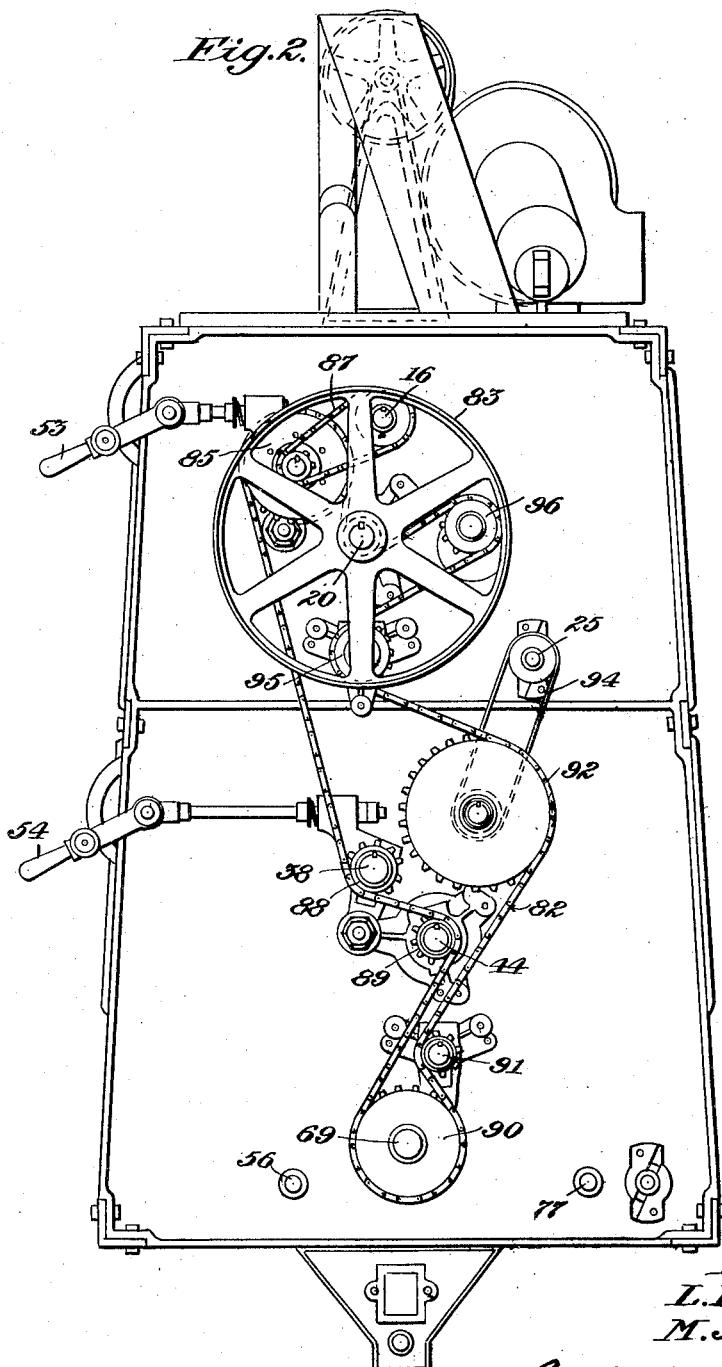

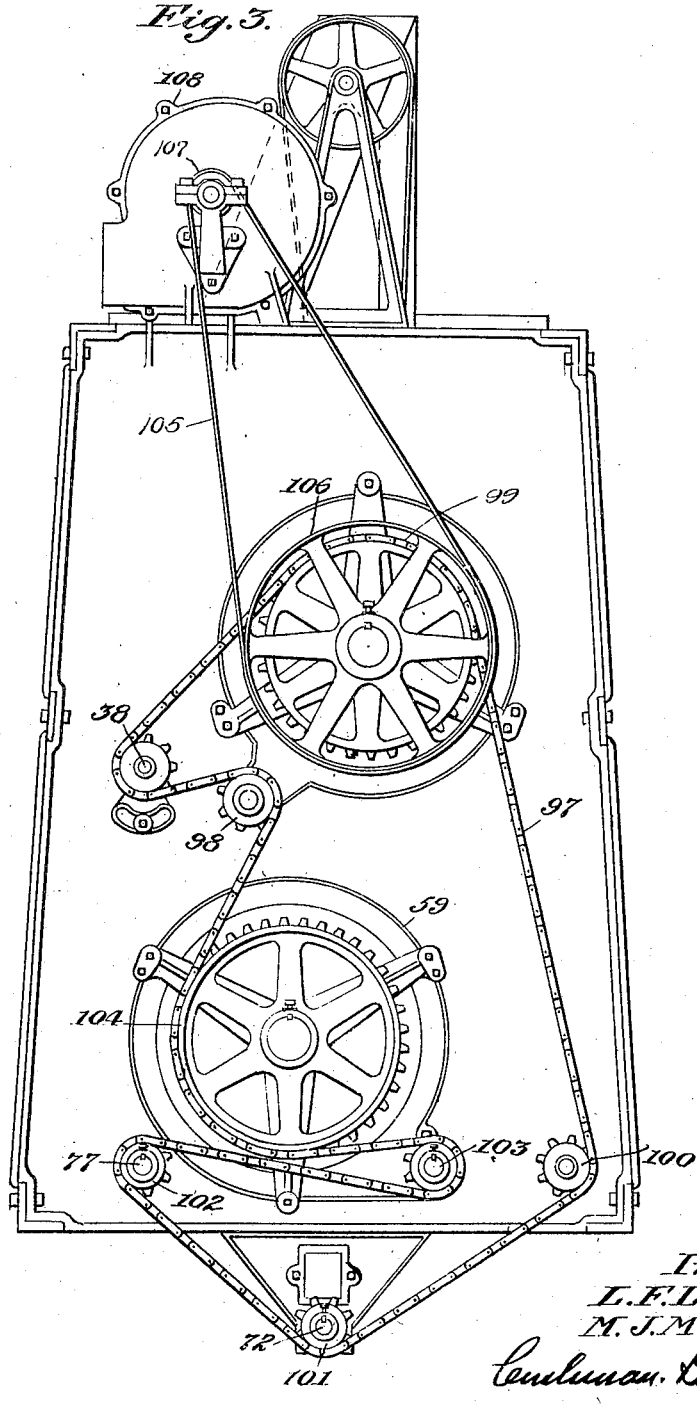

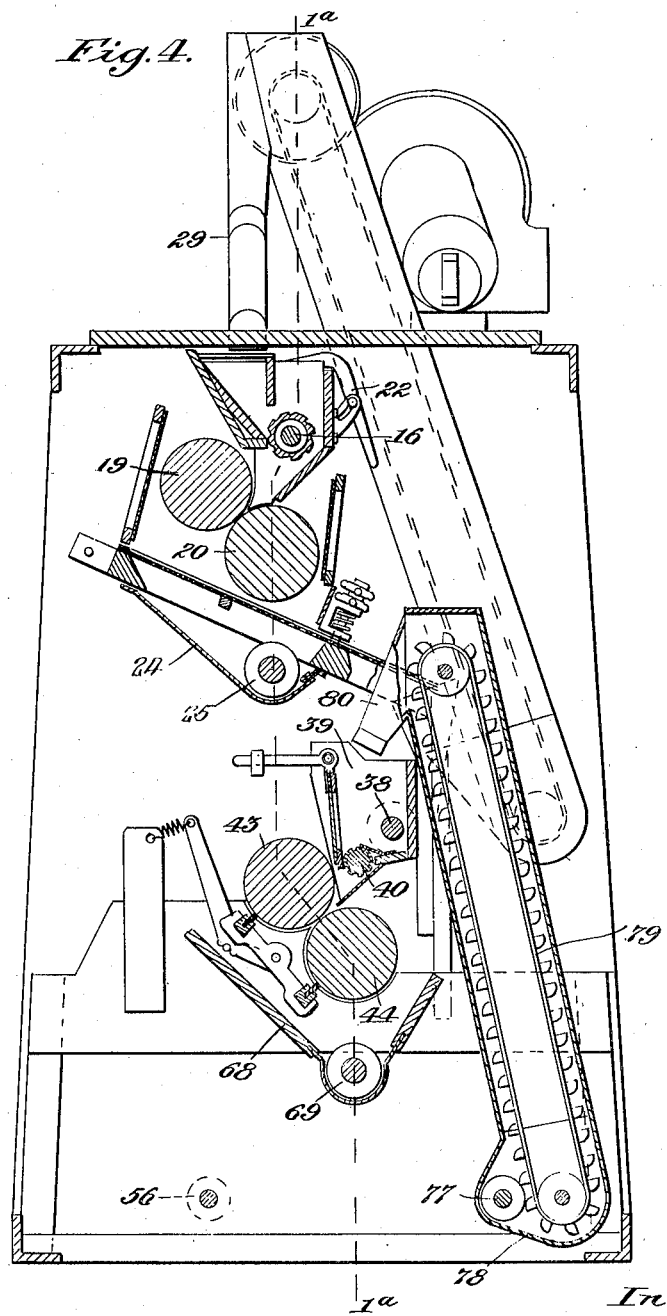

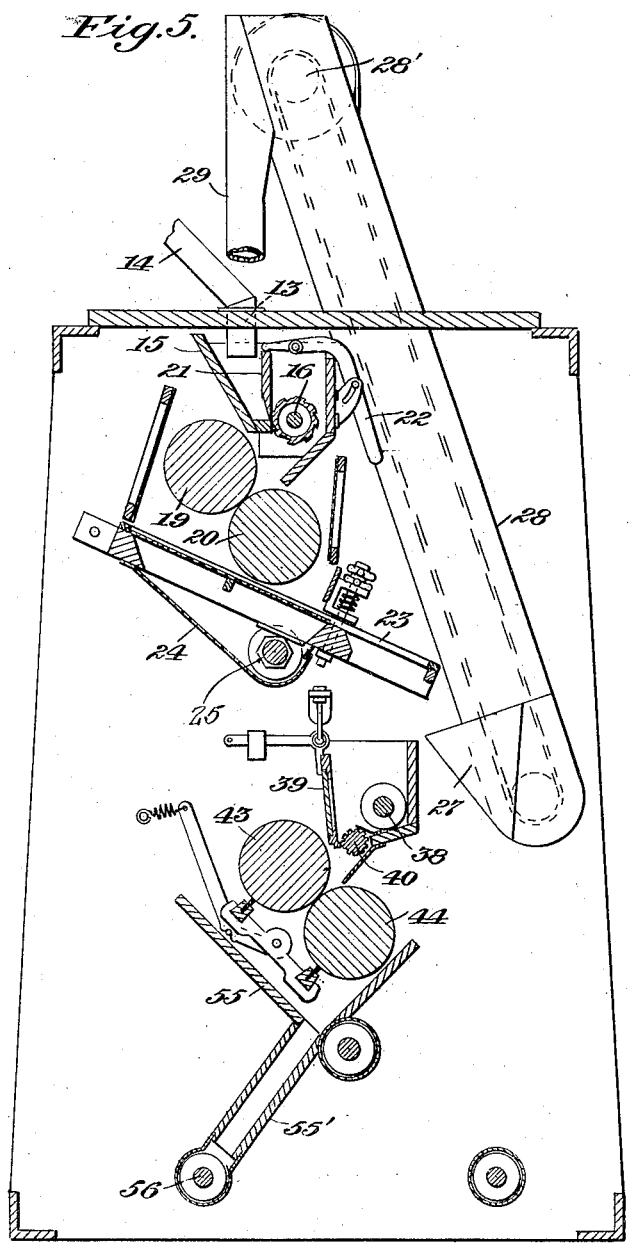

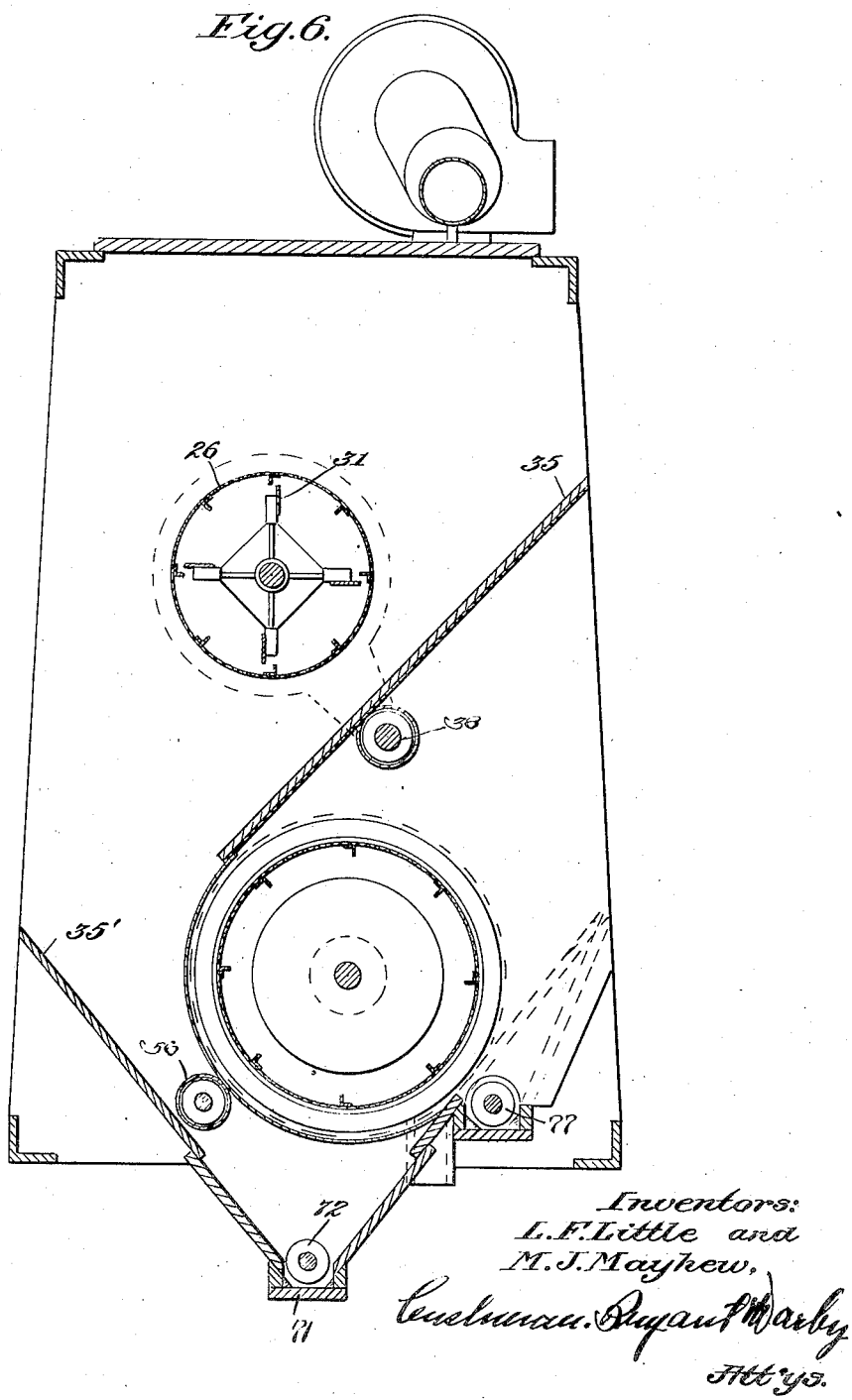

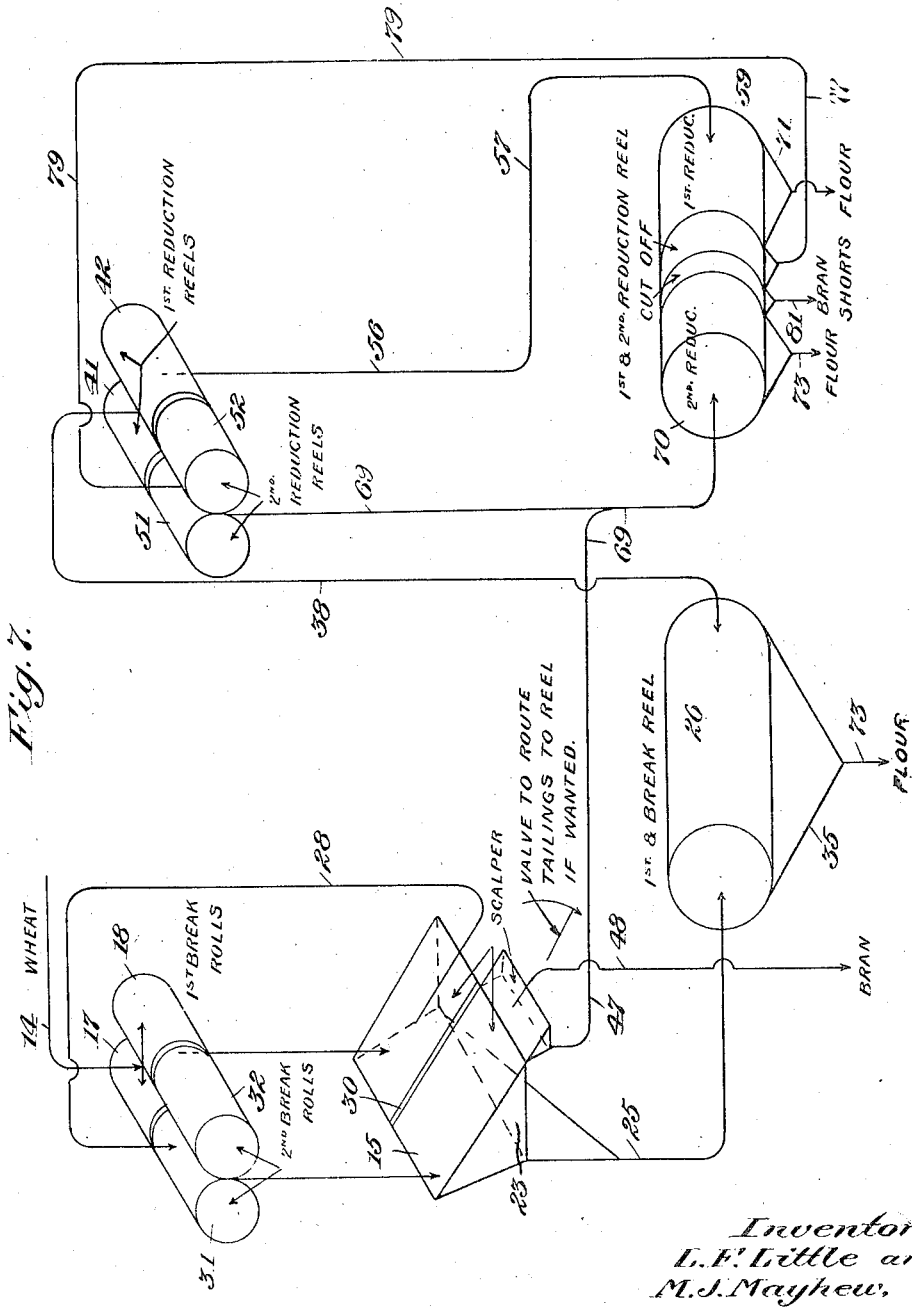

L. F. LITTLE ET AL 1,505,154

ROLLER GRINDING MILL

Filed June 13, 1922  11 Sheets-Sheet 9

Inventors:
L. F. Little and
M. J. Mayhew,

Aug. 19, 1924.

L. F. LITTLE ET AL
ROLLER GRINDING MILL
Filed June 13, 1922    11 Sheets-Sheet 10

1,505,154

Inventors:
L. F. Little and
M. J. Mayhew,
Cushman, Bryant & Darby
Att'ys

Aug. 19, 1924.
L. F. LITTLE ET AL
1,505,154
ROLLER GRINDING MILL
Filed June 13, 1922   11 Sheets-Sheet 11
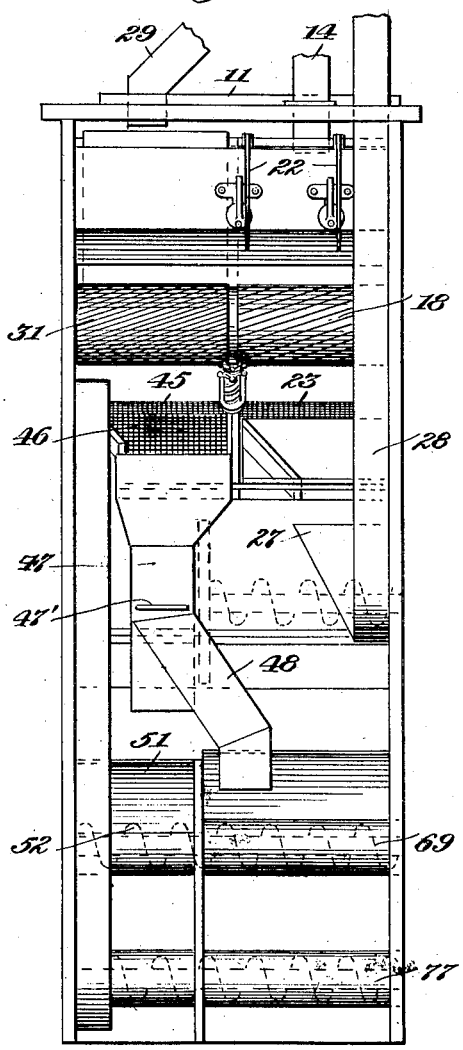
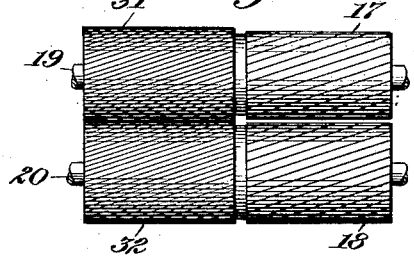
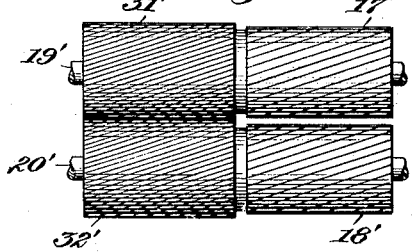
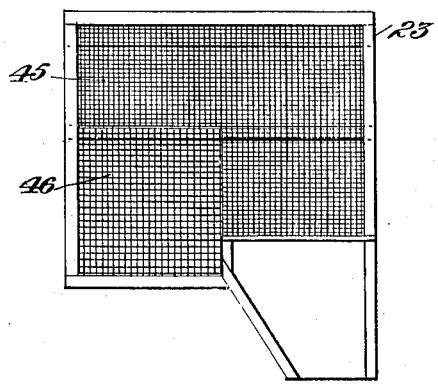
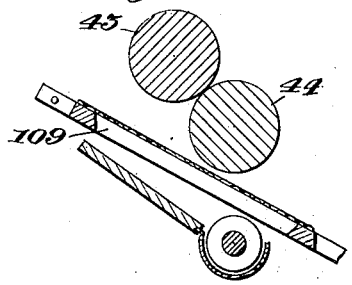
Inventors:
L. F. Little and
M. J. Mayhew,
Cushman, Bryant & Darby
Attys.

Patented Aug. 19, 1924.

1,505,154

UNITED STATES PATENT OFFICE.

LUCIUS FREEMAN LITTLE AND MARK J. MAYHEW, OF OWENSBORO, KENTUCKY.

ROLLER GRINDING MILL.

Application filed June 13, 1922. Serial No. 567,971.

*To all whom it may concern:*

Be it known that LUCIUS FREEMAN LITTLE and MARK J. MAYHEW, citizens of the United States, residing at Owensboro, in the county of Daviess and State of Kentucky, have invented new and useful Improvements in Roller Grinding Mills, of which the following is a specification.

The present invention relates to crushing and reducing instrumentalities, and is a continuation in part of applicants' co-pending application, Serial No. 483,593, filed July 9, 1921. For illustrative purposes, the invention is shown in connection with flour mills, but it will be understood that it may be readily utilized with materials other than grain if desired.

One of the primary objects of the present development is to reduce the cost of production and maintenance by simplifying the breaking, reducing and sieving elements of a mill of this character, and so combine and assemble them as to materially reduce the handling of stock, in converting it from the whole grain to flour, compared to mills of this general type now in use; this repeated handling of the stock being deleterious to the quality of the flour produced for the reason that repeated handling of flour stock inevitably results in increasing the fine bran content of such flour.

The objects aimed at are accomplished by providing crushing rolls having sections for performing two operations, as distinguished from a plurality of pairs of rolls for performing these operations, so that the number of break and reduction rolls may be reduced and yet the efficiency of the mill maintained. The invention contemplates further, the reduction of the number of reels or centrifugals for sifting the stock, and so routing the stock through the mill as that the flour content of the stock will be taken out immediately the reduction of the grain has proceeded to the point where the flour may be sifted out, and it is not repeatedly subjected to breaking and reducing actions, and sifting operations, which materially affects the quality and flavor of the flour.

In order that the invention may be clear to those skilled in the art, there is shown in the accompanying drawings, one embodiment of the invention, but it will be understood that this disclosure is merely illustrative and in no sense restrictive of the invention, as it may be worked out in different mechanical ways and still be within the range of the invention here disclosed:

In the drawings, wherein is shown a preferred embodiment of the present invention, Figures 1ª and 1ᵇ are longitudinal sectional views of a mill constructed in accordance with our invention.

Figure 2 is a front elevational view of the mill.

Figure 3 is a rear elevational view of the mill.

Figure 4 is a front end view of the break section with the outer wall removed taken substantially along the line 4—4 of Figure 1ª.

Figure 5 is a sectional view substantially on the line 5—5 of Figure 1ª.

Figure 6 is a sectional view substantially on the line 6—6 of Figure 1ᵇ.

Figure 7 is a diagram to illustrate the routing flow of the material through the mill disclosed in the other figures.

Figure 13 is a view of the break section with the front side wall removed.

Figure 14 is a detail view of the scalper sieve.

Figure 15 is a detail sectional view of a modified form of the invention showing a scalper positioned below the reduction rolls.

Figure 16 is a detail view of the crushing rolls.

Figure 17 is a view of a modified form of crushing rolls.

Figure 9:
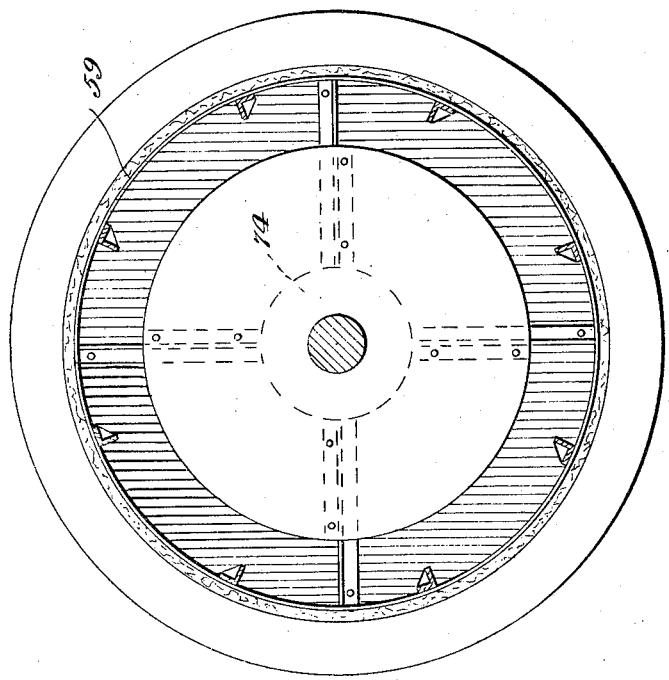
Figure 9 is a view looking from the left of Figure 8.

Referring to the drawings wherein like numerals indicate like parts in the various views, 10 denotes a mill casing of any suitable design and construction, which is formed of the usual break section 11 and the centrifugal reel section 12 arranged in operative relation with each other.

The break section 11 is formed with the inlet opening 13 which is adapted to receive the grain spout 14 or other equivalent feeding instrumentality, as shown in Figure 5, which conducts the grain to one side of the feed hopper 15, where, by means of the feed roller 16, the stock is evenly distributed on the coarse sections 17 and 18 of the break rolls 19 and 20, respectively, which constitute the first break of the mill. In order that the supply of wheat to the break rolls may be uniformly regulated, the hopper 15 is provided with an adjustable feed gate 21, which is preferably actuated by the levers 22.

The stock from the coarse first break sections 17 and 18 of the break rolls is delivered to the vibrating scalper 23. The throughs of the scalper 23 drop into the trough 24 from where they are carried by the spiral conveyor 25 to the centrifugal reel section 12 of the mill, being delivered to the head of the break reel 26.

The overtails of the scalper 23 fall into the elevator boot 27 and are carried by any suitable elevator, such as the bucket elevator 28, to the spout 29, and delivered to the opposite side of the hopper 15 from that where the grain from the spout 14 delivers to the coarse sections of the rolls, the sides of the hopper 15 being separated by the partition 30. The stock is then conducted by the feed roll 16, to the fine sections 31 and 32 of the break rolls 19 and 20 respectively, which fine sections constitute the second break section of the mill. From these sections the stock again falls on the scalper 23. The throughs from the said scalper pass to the trough 24 where they mix with the throughs of the coarse roll sections 17 and 18 and deliver to the head of the reel 26, and are thoroughly sieved therein.

The upper break roll 19 is preferably formed with its coarse section 17 of different diameter than its fine section 31, while the lower roll 20 has these two sections of uniform diameter. The peculiarity and advantage of stepping one roller is essential to the construction and operation of a mill of this type, since the depth of the step between the first break sections 17 and 18 and the second break sections 31 and 32 is large enough to make accurate construction and adjustment possible where only one roller is stepped, an advantage not obtainable where both the break rollers are of different diameters, since the step then would be too small to maintain the rollers in proper relation with each other.

The break reel 26 is preferably formed with a fine screen section 33 and a coarse section 34 so as to permit the best flour, which is the heaviest, to shift out first in the fine section, and the other flour, which is of inferior quality, to fall through at the tail of the reel. The interior of the reel 26 is suitably provided with beater elements 31, as shown in Figure 6. The flour from the break reel 26 is carried by the fall-boards 35 and 35' to the bottom of the reel section 12, while the tailings from the said reel, which are middlings, are carried to the rear end of the coarse section 34 of the reel, where they pass through the opening 37 to the spiral conveyor 38 and are returned to the roll section 11 of the mill, and delivered to any suitable feed box 39, being distributed by the feed roller 40 to the coarse sections 41 and 42 of the reduction rolls 43 and 44, which sections form the first reduction of the mill.

The vibrating scalper or sieve 23 has the screen section that is positioned under the fine break rolls 31 and 32 formed preferably with an upper portion of fine wire 45, and a lower portion of a coarse wire, such as 46, as shown in Figures 13 and 14 in order that the overtails from the sections 31 and 32, which fall on the coarse screen 46, can be immediately conducted by the alternative spout 47, which is provided with any suitable valve operating means, such as 47', so that the overtails may be either conducted by the spout arm 48 to a bran sack opening (not shown), or delivered to the conveyor 69 and carried to the reduction reel 70, at the will of the operator.

The break and reduction rolls are preferably maintained in proper adjustment by means of the hand levers 53 and 54, as shown in Figure 2. It will, however, be observed that the rolls can be thrown in and out of gear in any well known manner and adjusted both horizontally and vertically by any of the well known means commonly employed for this purpose.

The stock from the coarse or first reduction sections 41 and 42 of the rolls 43 and 44 drops into the fall-board 55 and the chute 55' as shown in Figure 5, and is conducted by the spiral conveyor 56 to the rear end of the reel section 12, being delivered by the wheel elevator 57 to the reel head 58 of the reduction reel 59, adjacent the rear end of the mill.

Figure 10:
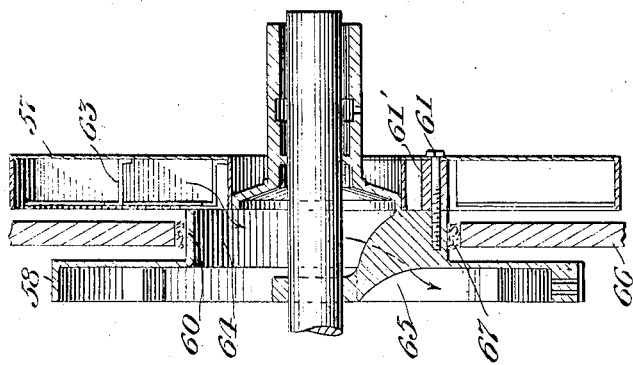
Figure 10 is a vertical section through the back end of the reduction reel and the wheel elevator.
Figure 12:
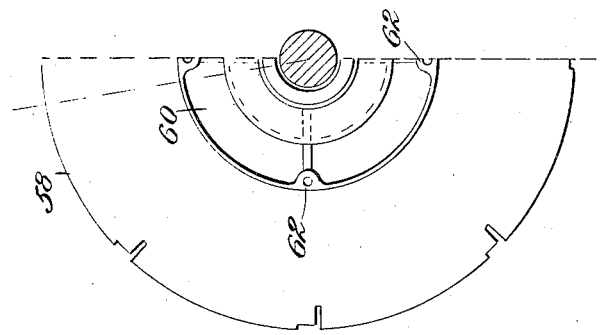
Figure 12 is a half elevation of the reduction wheel end looking from the right of Figure 10.

The wheel elevator 57, as shown in Figure 10, is preferably secured to the integral annular flange 60 of the reel head 58 by the threaded bolts 61, which pass through the openings 61' and engage the threaded recesses 62 in the reel head 58. The inner wall of the wheel elevator 57 is preferably provided with a plurality of long and short lifting blades or flights 63 positioned alternatively with respect to each other, which carries the stock up to the top of the elevator and delivers it to the opening 64, where it passes through the passage 65 to the interior of the reel 59, as shown by the arrows in Figure 10.

The partition 66 is preferably provided on its inner periphery adjacent the flange 60, with a wool ring 67 for preventing the collecting of any deleterious material thereon.

The stock from the fine sections 51 and 52 of the reduction rolls is conducted from the fall-board 68, as shown in Figure 4, to the conveyor 69 where it is carried and delivered to the reduction reel 70. The reels 59 and 70 constitute a double reduction reel, which can be fed with different stock at each and both of its ends, so that these two stocks are separately treated in the reel, the tailings being dressed in any suitable manner to take such directions as are necessitated by the nature of the stock, and the flour that is sifted through these reels being quite separate from each other.

Figure 8:
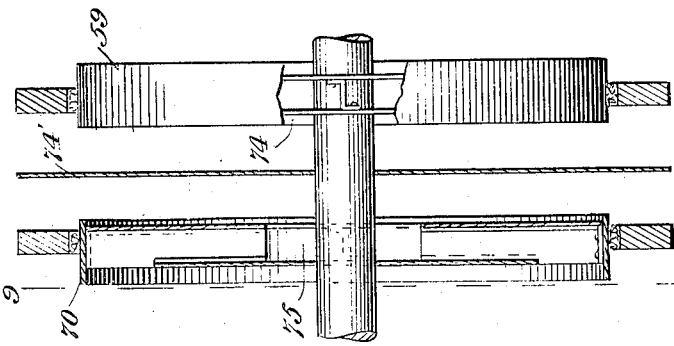
Figure 8 is an enlarged sectional view of the inner outlets of the reduction reel showing the left hand reel end being in section, while the right hand which is identical, is partly broken so as to show the lifting blades.
Figure 11:
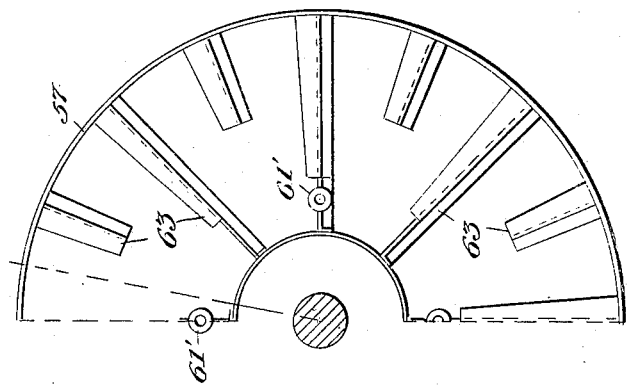
Figure 11 is a half elevation of the wheel elevator looking from the left of Figure 10.

The tailings in the reduction reels 59 and 70 are simultaneously sifted out, the flour preferably falling through to the trough 71, where it may be mixed with the flour from the break reel 26, previously referred to, and conducted by the spiral conveyor 72 to any suitable outlet, such as 73. The tailings from the reels 59 and 70 fall through openings 74 and 75, separated from each other by the disc 74', as shown in Figure 8, into the trough 76 where they are returned by means of the conveyor 77 to the boot 78 in the mill section, and carried by the bucket elevator 79, as shown in Figure 4, up to a spout 80, and delivered to the feed box 39 past the roller 40, onto the fine sections 51 and 52 of the reduction rolls.

After the stock has been ground by the rolls 51 and 52, it is again returned to the reel 70 where the flour drops into the trough 71, while the bran and shorts both from the reduction reel 59 and 70 are spouted from the hole 81, as shown in dotted lines in Figure 1b.

The break rolls 19 and 20 and the reduction rolls 43 and 44 are preferably driven at different speeds by means of the chain drive 82, shown in Figure 2, so as to give a slower movement of rotation to the upper rolls 19 and 43 of the break and reduction rolls respectively, so that there will be an attrition, due to the difference in speed between the rolls.

A belt driven pulley 83 is secured to the spindle of the lower break roll 20, which is further provided with a sprocket wheel 84, adapted to engage and operate the chain 82, which, after passing under the sprocket wheel 84, passes over the drive wheel 85 secured to the spindle of the roll 19, and is operatively connected to the feed roll 16 by the chain 87. Preferably the wheel 85 is of larger diameter than the wheel 84, as shown in Figure 2 so as to cause the upper roll 19 to rotate slower than the lower roll 20. The elevator 28 is driven by the belt drive 20' operatively connected at its lower end to the projecting spindle of the lower break roll 20, and at its upper end to the shaft 28' of the elevator 28, as shown.

The chain 82, after passing over the sprocket wheel 85, passes down into engagement with the drive wheel 88 secured to the conveyor 38, which conveyor extends across the mill and operates the chain drive 97 on the other side thereof; the chain 82 then passes over to the sprocket wheel 89 on the spindle of the lower reduction roll 44, from where it passes under the sprocket wheel 90 of the conveyor 69, up over the idler 91 to the idler 92, which is connected by the gears 93, as shown in Figure 1a, to the upper reduction roll 43, and by the belt drive 94 to the spiral conveyor 25. From the sprocket wheel 92, the chain is deflected over to the idler 95 up over the idler 96 and back to the sprocket wheel 84, as shown.

Referring to Figure 3, wherein is disclosed the drive mechanism for the reel section, the chain 97 is driven by the sprocket wheel 98 attached to the end of the conveyor 38, previously referred to. The chain then passes over the sprocket wheel 99, which rotates the break reel 26, down to engagement with the idler 100, over and around the sprocket 101 of the conveyor 72, up and across the drive wheel 102 on the conveyor 77, to engagement with the drive wheel 103 on the conveyor 56, then back across and into engagement with the sprocket wheel 104, secured to the spindle of the lower reduction reels 59 and 70. A belt 105 is connected at its lower end to a drive wheel 106 secured to the spindle of the break reel 26, while its upper end engages a pulley 107, which operates the fan 108 so as to insure proper ventilation of the mill and prevent the collection of dust therein.

Both the break reel and the reduction reels have their screen sections formed preferably out of silk cloth, which are secured to the ends of the reels by any suitable lacing strip. Where the reels are formed of coarse and fine sections, two sizes of silks, one much coarser than the other, is employed.

In Figure 7 is diagrammatically shown the routing and flow of the wheat from its entrance into the roll section to its final finishing and reduction to bran and shorts. From this figure and the legends thereon, it will be seen that the wheat is conducted by the hopper 14 to the first break sections 17 and 18 of the break rolls and delivered to the scalper 23, the overtails being returned by the elevator 28 to the second break sections 31 and 32, and the through stock mixing with the throughs from the sections 31 and 32, which sift through the scalper 23 and are carried by the conveyor 25 to the first break reel 26.

The overtails from the second break rolls 31 and 32 are conducted by the alternative spout 47 to a bran outlet by the arm 48 or to the second reduction reel 70 by the conveyor 69.

The flour from the first break reel 26 sifts through to a fall-board 35 where it is carried to the bottom of the reduction section and delivered by the conveyor 72 to the opening 73. The middlings from the reel 26 are returned to the mill section 11 by the conveyor 38 and delivered to the coarse sections 41 and 42 of the reduction rolls, where it is ground and carried by the conveyor 56 to the rear end of the mill and delivered by the bucket elevator 57 into the reduction reel 59 where it is again sifted; the flour being dropped into the trough 71 and the tailings returned to the mill section by the conveyor 77, where it is delivered by the elevator 79 to the second reduction rolls 51 and 52. The stock after thus being thoroughly ground is delivered to the second reduction reels 70 by the conveyor 69, the bran and shorts being spouted out through the opening 81 and the flour conducted to the opening 73, as previously described.

In Figure 15 of the drawing, which shows a modified form of the invention, a scalper sieve 109 is disclosed positioned below both sections of the reduction rolls 43 and 44, so as to provide additional means for insuring a proper sifting of the stock before the latter is conveyed to the reduction reels.

In Figure 16 is shown the preferred arrangement of the break and reduction rolls, in which the coarse section 17 of the upper break roll 19 is of smaller diameter than the fine section 31, while both the coarse section 18 and the fine sections 32 of the lower roll 20 are of uniform diameter.

In Figure 17, is disclosed a modified construction of break rolls in which both the sections 17' and 18' are of different diameters than the sections 31' and 32'.

From the foregoing it will be seen that a much more compact assembly may be secured by the arrangement of rolls, and the grain, from its initial breaking to its final reduction, is subjected to a minimum of handling in passing through the different instrumentalities, thereby preventing accretion of bran particles in the flour, which is incident to repeated handlings of the stock prior to separating out the flour from the stock, the present mill taking the flour out at different stages in the operation and whenever the flour content is ready to be taken out.

Such changes as are within the skill of the mechanic may, of course, be made in working out physical embodiments of this mill without departing from the spirit of our invention.

We claim:

1. In a mill of the class described, the combination of a casing having a roll section and a centrifugal section, a plurality of pairs of coaxially extending break rolls in said roll section, a scalper for receiving the stock as it issues from said rolls, a break reel in said centrifugal section, means for conveying the throughs from said scalper to said reel, means for returning the overtails from said scalper to one pair of said rolls, a plurality of pairs of reduction rolls below said break rolls, and means for conveying the material from said reel to said reduction rolls.

2. In a mill of the class described, the combination of a casing having a roll section and a centrifugal section, a plurality of pairs of coaxially extending break rolls in said roll section, a scalper for receiving the stock as it issues from said rolls, a break reel in said centrifugal section, means for conveying the throughs from said scalper to said reel, means for returning the overtails from said scalper to one pair of said rolls, a plurality of pairs of reduction rolls below said break rolls, means for conveying the material from said reel to said reduction rolls, a reduction reel in said centrifugal section positioned below said break reel, and means conveying the material from a section of said reduction rolls to said reduction reel.

3. In a machine of the class described, the combination of a pair of break rolls having a plurality of break sections, a break reel, a scalper under said rolls, means for conveying the through stock from said scalper to said reel, means for returning the overtails of one of said sections to the other of said break rolls, a pair of reduction rolls having a plurality of reduction sections, a double reduction reel, means for conveying the stock from said break reel to one of said reduction roll sections, means for conveying the overtails of said other break rolls to one end of said reduction reel, means for conveying stock from one of said reduction rolls to the other end of said reduction reel, and means for conveying the stock from said reduction reel to one of said reduction rolls.

4. In a machine of the class described, the combination of a pair of stepped break rolls having a plurality of break sections, a break reel, a scalper under said rolls, means for conveying the through stock from said scalper to said reel, means for returning the overtails of one of said sections to the other of said break rolls, a pair of reduction rolls having a plurality of reduction sections, a double reduction reel, means for conveying the stock from said break reel to one of said reduction roll sections, means for conveying the overtails of said other break rolls to one end of said reduction reel, means for conveying stock from one of said reduction rolls to the other end of said reduction reel, and means for conveying the stock from said reduction reel to one of said reduction rolls.

5. In a machine of the class described, the combination of a pair of break rolls having a plurality of break sections, a break reel, a scalper under said rolls, means for conveying the through stock from said scalper to said reel, means for returning the overtails of one of said sections to the other of said break rolls, a pair of reduction rolls having a plurality of reduction sections of different lengths, a double reduction reel, means for conveying the stock from said break reel to one of said reduction roll sections, means for conveying the overtails of said other break rolls to one end of said reduction reel, means for conveying stock from one of said reduction rolls to the other end of said reduction reel, and means for conveying the stock from said reduction reel to one of said reduction rolls.

6. In a machine of the class described, the combination of a pair of break rolls having a plurality of break sections, a break reel, a scalper under said rolls, means for conveying the through stock from said scalper to said reel, means for returning the overtails of one of said sections to the other of said break rolls, a pair of reduction rolls having a plurality of reduction sections, a scalper under said reduction rolls, a double reduction reel, means for conveying the stock from said break reel to one of said reduction roll sections, means for conveying the overtails of said other break rolls to one end of said reduction reel, means for conveying stock from one of said reduction rolls to the other end of said reduction reel, and means for conveying the stock from said reduction reel to one of said reduction rolls.

7. In a machine of the class described, the combination of a pair of rolls having a pair of fine break sections and a pair of coarse break sections, a break reel, a vibrating scalper under said rolls, means for conveying the through stock from said scalper to said break reel, means for returning the overtail stock from said coarse section of said rolls to said fine section, a pair of reduction rolls having a pair of fine sections and a pair of coarse roll sections, a double reduction reel, means for conveying the stock from said break reel to the coarse section of said reduction rolls, means conducting the overtails of the fine section of said break rolls to one end of the reduction reel, means conveying the stock from the coarse section of said reduction rolls to the other end of said reel, and means for conveying the stock from said reduction reel to the fine section of said reduction rolls.

8. In a machine of the class described, the combination of a pair of stepped rolls having a pair of fine break sections and a pair of coarse break sections, a break reel, a vibrating scalper under said rolls, means for conveying the through stock from said scalper to said break reel, means for returning the overtail stock from said coarse section of said rolls to said fine section, a pair of reduction rolls having a pair of fine sections and a pair of coarse roll sections, a double reduction reel, means conveying the stock from said break reel to the coarse section of said reduction rolls, means conducting the overtails of the fine section of said break rolls to one end of the reduction reel, means conveying the stock from the coarse section of said reduction rolls to the other end of said reel, and means for conveying the stock from said reduction reel to the fine section of said reduction rolls.

9. In a machine of the class described, the combination of a pair of rolls having a pair of fine break sections, and a pair of coarse break sections, one of said rolls having its sections of different diameters, a break reel, a vibrating scalper under said rolls, means for conveying the through stock from said scalper to said reel, means for returning the overtail stock from said coarse section of said rolls to said fine section, a pair of reduction rolls having a pair of fine sections, and a pair of coarse roll sections of different lengths, a reduction reel provided with double walled partitions, means for conveying the middlings of said break reel to the coarse section of said reduction rolls, an alternative spout for carrying the overtails of the fine section of said break rolls to either one side of the reduction reel or to a bran spout, means conveying the stock from the coarse section of said reduction rolls to the other side of said reel and means for conducting the stock from said reduction reel to the fine section of said reduction rolls.

10. In a machine of the class described, the combination of a pair of break rolls having a plurality of break sections, a break reel, a scalper under said rolls, means for conveying the through stock from said scalper to said reel, means for returning the overtails of one of said sections to the other of said break rolls, a pair of reduction rolls having a plurality of reduction sections, a reduction reel provided with separate sections, means for conveying the stock from said break reel to one of said reduction roll sections, means for carrying the overtails of said other break rolls to one section of said reduction reel, means for conveying stock from one of said reduction rolls to the other section of said reduction reel, and means for conveying the stock from both sections of said reduction reel to one of said reduction rolls.

In testimony whereof we have hereunto set our hand.

LUCIUS FREEMAN LITTLE.
MARK J. MAYHEW.